United States Patent [19]

Wurz

[11] Patent Number: 4,543,108
[45] Date of Patent: Sep. 24, 1985

[54] MIST ELIMINATOR FOR ELIMINATING DROPLETS FROM A GASEOUS FLOW

[76] Inventor: Dieter Wurz, Haid und Neu Str. 8, 7500 Karlsruhe, Fed. Rep. of Germany

[21] Appl. No.: 644,328

[22] Filed: Aug. 24, 1984

[30] Foreign Application Priority Data

Aug. 24, 1983 [DE] Fed. Rep. of Germany ....... 3330533
Feb. 22, 1984 [DE] Fed. Rep. of Germany ....... 3406425

[51] Int. Cl.[4] .............................................. B01D 45/08
[52] U.S. Cl. ............................................ 55/1; 55/440
[58] Field of Search ................ 55/1, 17, 192, 257 PV, 55/440–444

[56] References Cited

U.S. PATENT DOCUMENTS

| 1,803,854 | 5/1931 | Kniskern ..................................... 55/1 |
| 1,926,924 | 9/1933 | Sylvan ..................................... 55/440 |
| 3,224,175 | 12/1965 | Beach ..................................... 55/440 |
| 3,254,475 | 6/1966 | Farr et al. .......................... 55/440 X |
| 3,527,030 | 9/1970 | Hungate ............................. 55/440 |
| 3,748,832 | 7/1973 | Furlong et al. .................... 55/440 X |
| 3,953,183 | 4/1976 | Regehr ............................... 55/440 |
| 3,977,977 | 8/1976 | Kall ................................. 55/440 X |
| 4,014,669 | 3/1977 | Thompson et al. ............. 55/440 X |
| 4,198,219 | 4/1980 | Krisko ................................. 55/440 |

FOREIGN PATENT DOCUMENTS

| 1544115 | 7/1970 | Fed. Rep. of Germany . |
| 2146205 | 3/1972 | Fed. Rep. of Germany . |
| 2233480 | 1/1973 | Fed. Rep. of Germany . |
| 2251173 | 2/1974 | Fed. Rep. of Germany . |
| 2347984 | 4/1975 | Fed. Rep. of Germany ........ 55/440 |
| 2521845 | 11/1975 | Fed. Rep. of Germany ........ 55/440 |
| 2752597 | 5/1979 | Fed. Rep. of Germany ........ 55/444 |
| WO80/01046 | 5/1980 | PCT Int'l Appl. ....................... 55/1 |
| 578985 | 11/1977 | U.S.S.R. ............................... 55/440 |

Primary Examiner—Robert Spitzer
Attorney, Agent, or Firm—Curtis, Morris & Safford

[57] ABSTRACT

A mist eliminator for eliminating droplets from a gaseous flow, for instance in cooling towers, comprises parallel profile elements including flow passages with constrictions and deflecting sections for mist elimination therebetween. A droplet acceleration section is provided upstream of the first deflecting section in order to reduce pressure losses while keeping the eliminating efficiency constant or even improving the same.

33 Claims, 11 Drawing Figures

MIST ELIMINATOR FOR ELIMINATING DROPLETS FROM A GASEOUS FLOW

The invention is directed to a mist eliminator for eliminating droplets from a gaseous flow, in which flow passageways including constrictions and deflecting sections are formed by means of profile elements on the walls of which the droplets are eliminated and which are oriented such that the eliminated liquid may flow along said walls towards the inlet portion of the flow passageways under the action of gravity.

A droplet eliminator of this type has been known, for instance, from the DE-OS No. 1,544,115.

As shown in FIG. 1, for the elimination of liquid droplets from gaseous flows the known eliminator comprises profile elements or shaped members of sheet metal or synthetic material, said profile elements being bent in parallel and symmetrically to a plane $E_S$ and causing double deflection of the flow between the inlet plane $E_E$ and the exit plane $E_A$. The profile elements have constant thickness throughout the length of the flow passageway. The droplet-laden flow is accelerated in each of the constrictions. The greater the size of a droplet, the less will it be able to follow the deflecting section. The drops are carried from the curved path and strike the eliminating surface of a profile element. Three kinds of interaction between droplets and eliminating surface may occur:

(a) the droplets are trapped by the surface;
(b) the droplets are reflected;
(c) the droplets burst and are in part trapped and in part reflected.

Reflection, which constitutes an impediment to the mist elimination process, will have to be expected particularly when the droplets strike the eliminating surface approximately tangentially.

Since in the known mist eliminator the droplets due to their inertia are unable to follow the velocity increase caused by the short-distance constriction, the velocity of the droplets in the deflecting section falls far short of the high velocity of the gaseous phase which would be advantageous to mist elimination. In order to achieve a satisfactory degree of elimination it is necessary to increase the approach flow velocity and/or the deflection, both resulting in high pressure losses.

It is the object of the instant invention to provide a mist eliminator of the type specified above in such a way that practically all droplets, including small and floating droplets, may be eliminated with high efficiency and minimum pressure losses.

This object is solved in accordance with the invention in that a respective droplet acceleration section is provided between adjacent profile elements upstream of the first deflecting section, said acceleration section being dimensioned so that at least small droplets are accelerated at the inlet to the deflecting section to a velocity which differs only slightly from the gas flow velocity at that location.

In accordance with the invention the flow cross-section is reduced in the region preceding the first deflecting section. This causes an increase in the velocity of the gaseous phase, whereby the droplets are accelerated to a high velocity prior to reaching the region of the first deflecting section. Until now, an acceleration of the droplets upstream of the first deflecting section, i.e., in the inlet area of the flow passageway, was prevented by the concern that such an acceleration would be unfavourable in view of the eliminated liquid flowing back to the inlet and there separating in the form of large drops. This prejudice among those skilled in the art, which has existed for many years, is overcome by the invention with surprising success.

With a mist eliminator in accordance with the invention one may expect a reduction in pressure losses between 20 and 40% as compared to conventional mist eliminators, while the eliminating efficiency is not deteriorated. When the novel mist eliminator is employed, for instance, in natural draft cooling towers, this allows considerable savings as to stack height, and when it is employed in fan cooling towers, considerable fan driving power may be saved, because in the mist eliminators according to the invention the velocity of the approaching flow may be reduced while the profile elements operate with the same eliminating efficiency.

In accordance with a preferred configuration of the invention a gas acceleration section is provided upstream of the droplet acceleration section having a substantially constant or substantially progressively decreasing flow cross-section. In the short gas acceleration section the gas velocity is quickly increased to a high velocity, whereas the droplets due to their substantially greater inertia do not or only slightly increase their velocity. In the droplet acceleration section, which of course may also be designed to further increase the gas velocity (e.g. by a progressive reduction of the cross-section), the droplets due to their flow resistance are accelerated by the higher-velocity gaseous phase before the droplets reach the first deflecting section. This is favourable to mist elimination because faster droplets tend to keep their direction and are therefore rather flung out onto the pressure sides of the deflecting regions and thus also strike the profile elements at larger angles, so that there is less risk of droplet reflection. Moreover, it is possible at lower velocities to achieve the same eliminating efficiency as before, so that reduced pressure losses result. One deflecting section will be sufficient, although several deflecting sections arranged in series may increase the eliminating efficiency.

In order to further reduce pressure losses, a further important embodiment of the invention provides that the thickness of the profile elements towards the exit plane of the flow passageways, starting from the first deflecting section, is reduced to thereby form diffusors having a flare angle between 4° and 12°.

The reliable discharge of the water films formed by the eliminated droplets on the mist eliminator poses a difficulty, since small droplets have to be prevented from being re-entrained in the gas flow.

To this end a further advantageous configuration of the invention provides that the profile elements are formed with drain-off passages for the eliminated liquid, said drain-off passages terminating towards the inlet plane and transferring the thin-film liquid into thicker individual strands and allowing the same to drain or drop off the inlet edges of the profile elements without the risk of being re-entrained in the gas flow.

For further improving the eliminating efficiency, an important embodiment of the invention provides that the droplet acceleration section is inclined relative to the approach flow direction at an angle of not more than 30°, preferably between 5° and 20°, advantageously with a slight curvature, so that the first deflecting section is increased.

In a correspondingly configured mist eliminator according to the invention a sufficient difference between the flow velocity and the so-called "break-through velocity", above which the eliminated liquid film is entrained in opposition to the acceleration due to gravity towards the rear edge of the eliminating surface, is ensured and at the same time a very low pressure loss is realized. This is due to the fact that the droplet acceleration section is designed such that the droplets are flung onto the first eliminating surface at a more favourable angle.

Advantageously, the profile element thickness in the droplet acceleration section is in the range of 0.2 to 0.6 times the centre distance of two adjacent profile elements, while the length of the droplet acceleration section is preferably about 0.5 times to twice the centre distance of two adjacent profile elements.

Due to the deflection of the droplet paths in the droplet acceleration section, which deflection appears to be very slight, it is possible to select a relatively large angle of inclination of the first eliminating surface relative to a plane which is parallel to the inlet plane of the mist eliminator without the risk of making the angle of impact on the first eliminating surface required for efficient mist elimination too small. A large angle of inclination offers advantages because the flow towards the exit of the mist eliminator requires only relatively little deflection, which in turn results in reduced pressure losses.

When it is desired to achieve particularly high eliminating efficiencies with a mist eliminator, a further configuration of the invention suitably provides that downstream of the eliminating surface behind the first deflecting section at least a second deflecting section having a succeeding eliminating surface is provided. The realization of this concept results in an improved eliminating efficiency even if the slight inclination or curvature of the first droplet acceleration path is not provided.

It is advantageous to have the exit ends of the profile elements enlarged. This feature allows orientation of the eliminating surfaces at a favourable angle to the approaching stream of droplets. This embodiment offers the further advantage that the mist eliminators are made accessible when boards are placed across the exit rims. This is particularly advantageous when the mist eliminators according to the invention are employed in cooling towers.

Depending on the size distribution of the droplets it may be advantageous to design the second eliminator stage not only for trapping reflected droplets but basically for eliminating smaller droplets. In accordance with a further embodiment of the invention this may be achieved in that the flow passageway in the region downstream of the first and/or downstream of each further deflecting section includes a constriction, whereby a further droplet acceleration section is formed. In this case it is favourable to select the radii of curvature at the second deflecting section to be smaller than at the first one, i.e., to deflect the flow more strongly, so that sufficiently high centrifugal forces are produced which are required for the elimination of smaller droplets.

This results in particular advantages as to the discharge of water due to a more favourable distribution of shearing strain at the profile elements.

The mist eliminators discussed so far are intended for counterflow operation, i.e., when the gas flows oppositely to the dischgarged liquid. Therefore the profile elements have to be assembled such that the eliminated water flows back to the inlet of the flow passageways formed between the profile elements, for instance with the longitudinal extension of the profile elements being horizontally disposed and the transverse extension thereof being vertically disposed. In cases of cross-flow operation, i.e., when the gas flows transversely to the eliminated liquid, a corresponding reconfiguration is necessary, for instance including collecting flutes (DE-OS No. 2,146,205, DE-AS No. 2,251,173, DE-OS No. 2,347,984) or projections (DE-OS No. 2,233,480) on the eliminating surfaces so that the eliminated water may flow off transversely to the gas flow, i.e., in the longitudinal direction of the profile elements.

The invention also seeks to optimize such a type of mist eliminator in respect of pressure losses and eliminating efficiency. In accordance with a further aspect of the invention, in a mist eliminator for eliminating droplets from a gaseous flow, in which flow passageways including constrictions and deflecting sections are formed by means of profile elements on the walls of which the droplets are eliminated and which are oriented such that the eliminated liquid may flow off along said walls substantially transversely to the main flow direction under the action of gravity, a droplet acceleration section being provided between adjacent profile elements in the region preceding the first deflecting section and collecting flutes being formed on the or each eliminating surface following a deflecting section, it is provided according to the invention that the maximum thickness of each profile element is about 0.2 to 0.6 times the centre distance between two adjacent profile elements, that the length of the droplet acceleration section is about 0.5 times to twice the centre distance, and that the collecting flutes are disposed on the eliminating surfaces in such a way that their tips, as viewed in the direction of flow, are spaced from the preceding deflecting section by between $\frac{1}{4}$ and $\frac{2}{3}$ the length of the eliminating surface following said deflecting section.

This embodiment of the mist eliminator of the invention results in a considerable improvement of eliminating efficiency even without the above-described slight inclination or curvature of the droplet acceleration section preceding the first deflecting section.

It is an advantage of this embodiment of the invention that the collecting flutes will also catch reflected droplets. The collecting flutes are provided in the region which for cleaning purposes is well accessible to a jet of water. This is especially favourable when the droplets are charged with scale-forming matter as, for instance, in flue gas cleaning systems.

The invention also relates to a method comprising the features specified in claim 17.

Embodiments of the invention will be explained in detail with reference to schematic drawings, in which.

FIG. 7a and

Figure 6:
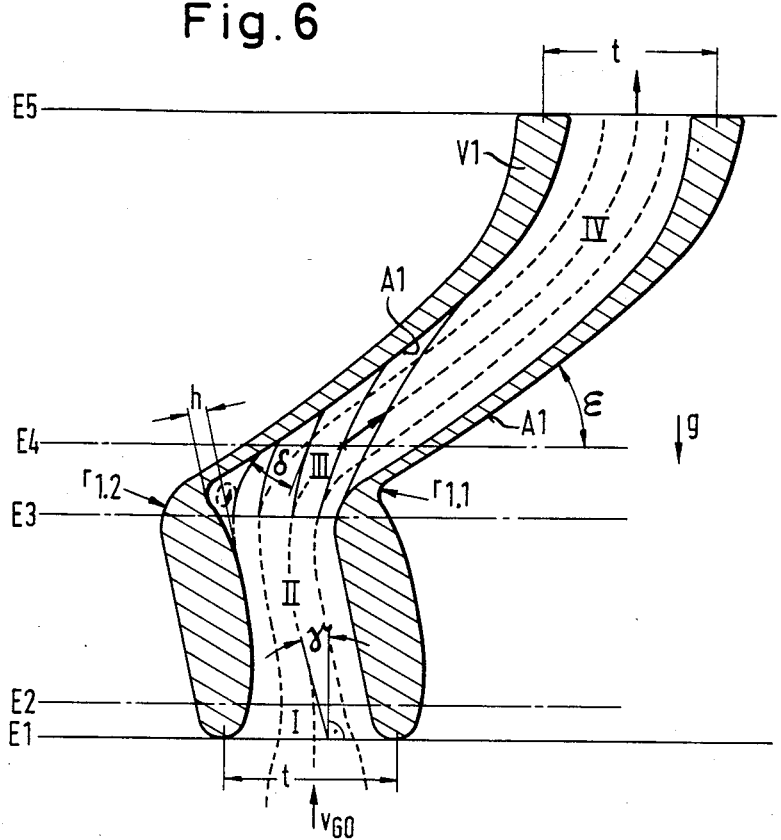
FIG. 6 is a cross-section through two adjacent profile elements of a modified mist eliminator according to the invention.
Figure 7A:
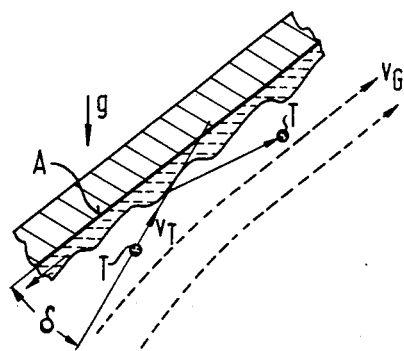
Figure 7B:
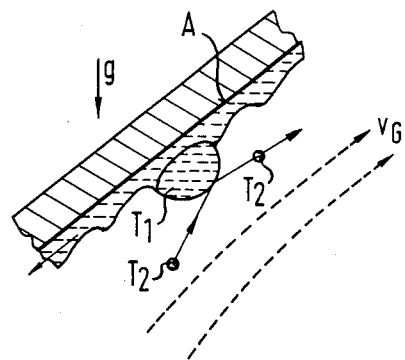
Figure 8:
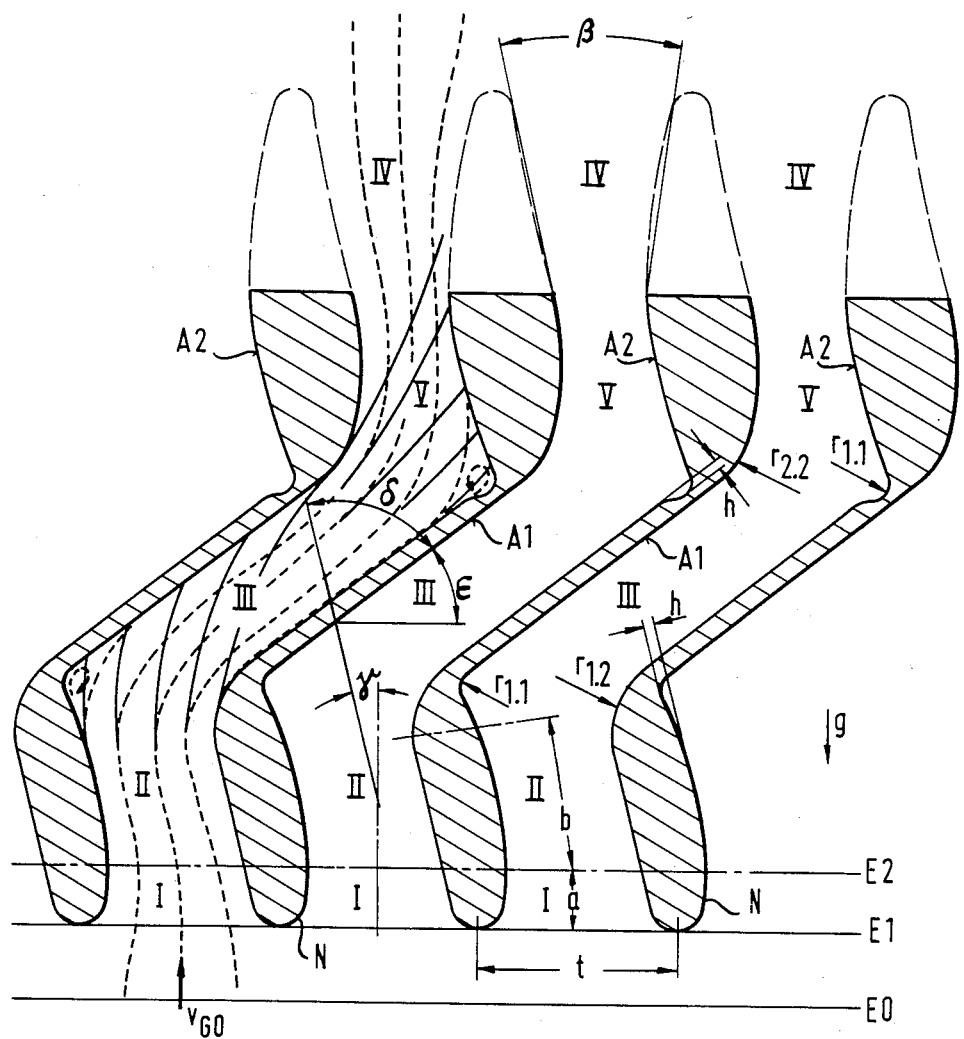
Figure 9:
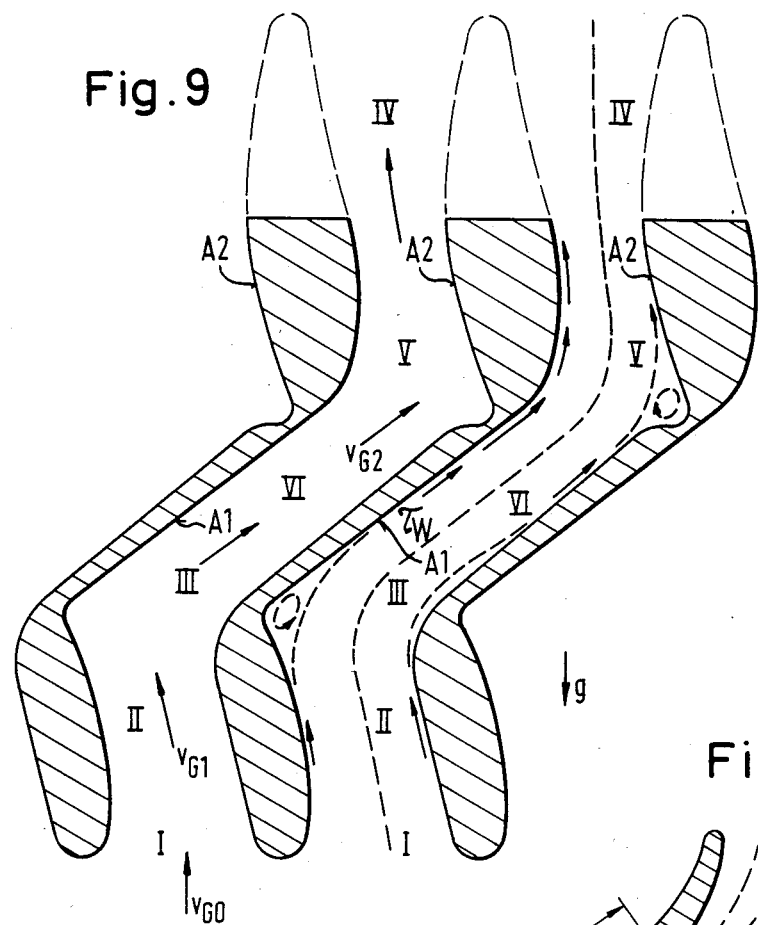
Figure 10:
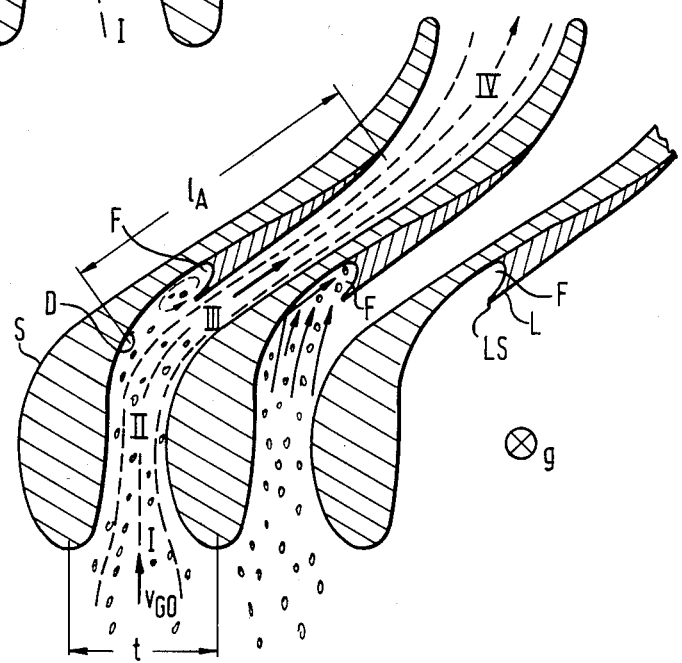

FIG. 7b are wall portions of eliminating surfaces of the mist eliminator shown in FIG. 6, where flow phenomena are illustrated which occur in operation;

FIG. 8 is a cross-section through adjacent profile elements of a two-stage mist eliminator according to the invention, showing two alternative profile element configurations;

FIG. 9 is a cross-section through adjacent profile elements of a mist eliminator that is a modification of FIG. 8; and FIG. 10 is a cross-section through adjacent profile elements of a further embodiment of the mist eliminator according to the invention.

The profile elements shown in the drawing extend perpendicularly to the plane of projection for any desired length and with constant cross-section.

Figure 4:
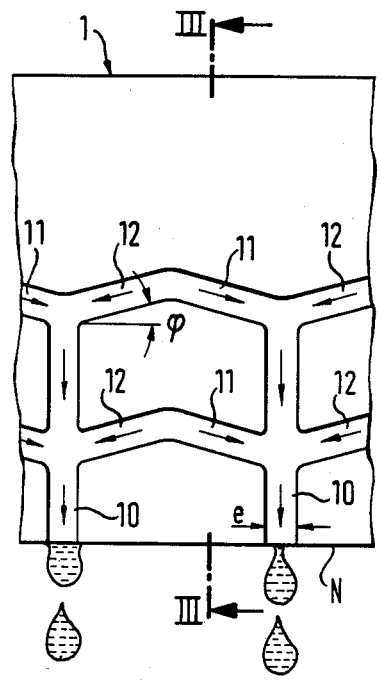
FIG. 4 is a partial view of the profile element shown in FIG. 3.

Symbols used in the drawings and in the following specification have the following meaning:

a—length of the acceleration section for the gaseous phase;
b—length of the droplet acceleration section;
c—length of the deflecting section for the gaseous phase or separation length, respectively;
d—length of the deceleration section for the gaseous phase where compressive energy is recovered;
e—narrowest passageway cross-section;
g—acceleration due to gravity;
h—drawn-in portion on concave profile element side;
$l_A$—length of eliminating surface A;
r—radius of curvature at deflecting section;
s—maximum profile element thickness in first droplet acceleration section;
t—pitch or centre distance of the profile elements;
$v_G$—gas velocity in the planes E;
$v_T$—velocity of the droplets in the planes E;
A—eliminating surface;
D—pressure side or concave profile element side;
E—plane extending transversely to the approach flow direction, numbered in ascending order in flow direction;
F—collecting flute;
L—lip of the collecting flute;
LS—tip of the flute lip;
N—nose of the profile elements;
S—suction side or convex profile element side;
St—webs to stiffen the hollow-section profile elements;
T—droplets;
V—enlargement;
I—gas acceleration section;
II—droplet acceleration section;
III—first deflecting and eliminating section;
IV—diffusor section;
V—second deflecting and eliminating section;
VI—second droplet acceleration section;
α—maximum angle of deflection;
$α_g$—assembly angle relative to the direction of acceleration due to gravity;
β—diffusor angle of the diffusor starting in the plane E4 and terminating in the exit plane E5;
γ—mean angle of inclination of the droplet acceleration section II;
δ—angle of impact of the droplets on the eliminating surface A;
ε—inclination of the eliminating surface A relative to the plane E;
$ι_w$—wall shearing strain;
φ—inclination of stem portions 11,12 (FIG. 4).

Figure 1:
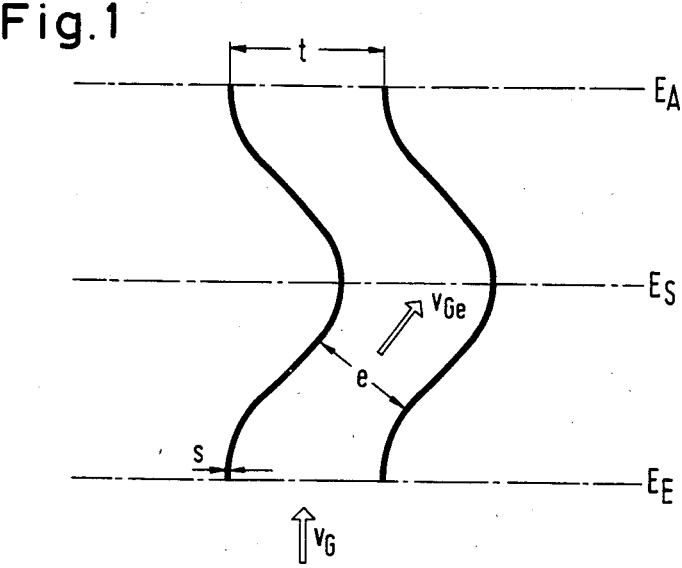
FIG. 1 is a cross-section through two adjacent profile elements or shaped members of a conventional mist eliminator.
Figure 2:
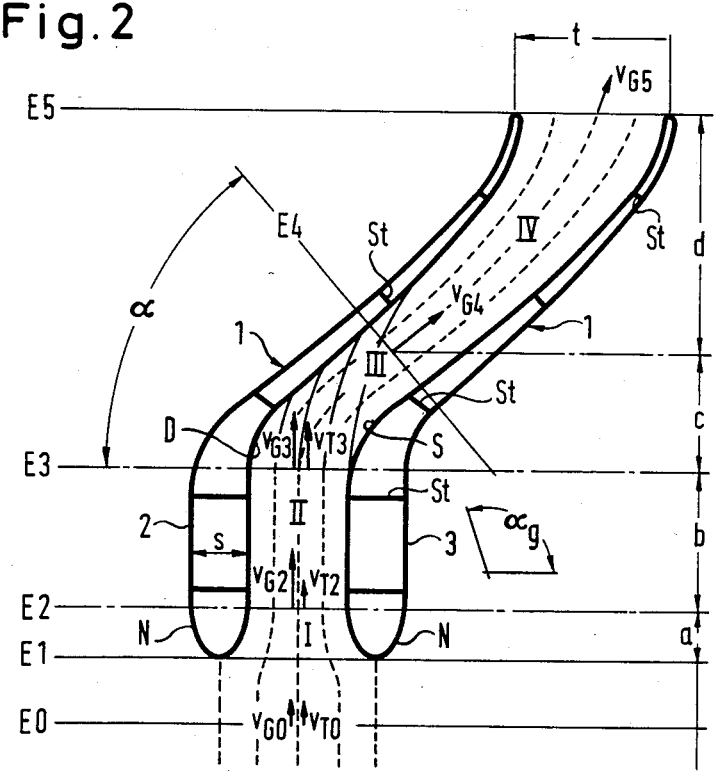
FIG. 2 is a cross-section through two adjacent profile elements of a mist eliminator in accordance with the invention.

As shown in FIG. 2, each profile element 1 has a rounded-off nose N starting in the inlet plane E1 and having a cross-section which increases progressively to a maximum profile element thickness s. The length a at the nose N in flow direction is approximately 0.2-times to 1-times the length b of the subsequent droplet acceleration section II extending in approach flow direction, said length b in turn being in the range between about 0.5 times to twice the centre distance t.

The maximum profile element thickness s in the droplet acceleration section II remains approximately constant over the section length b and advantageously is within the range of 0.2 times to 0.6 times the centre distance t.

For instance, in a structure suitable for assembly in cooling towers the centre distance t is about 40 mm, while the profile element overall height a+b+c+d is about 150 mm. These numerical values are intended merely to illustrate an example of the actual profile element dimensions.

The mean angle α of the first deflecting section is to be between 20° and 70°. The values for c and d result substantially from the above-specified parameters a, b, s, t and α, β.

A flow passage section in the form of the first deflecting section III of the flow passage starts in the plane E3. As from this plane E3, the wall thickness of the hollow-section profile elements decreases continuously so that the restriction of the flow cross-section from the plane E3 to the plane E4 is not excessive. The first deflecting section III terminates in the plane E4, which is normal to the flow section. In the illustrated embodiment, the angle α between the flow cross-sections in the planes E3 and E4 is 45°. As already mentioned, it may be in the range between about 20° and 70°.

In the plane E0 preceding the inlet plane E1, gas and small droplets have approximately the same velocity $v_{G0}$, $v_{T0}$. In the plane E2 the gas is accelerated due to the first restriction I to a velocity $v_{G2}$ which is substantially higher than the droplet velocity $v_{T2}$. In the droplet acceleration section II the droplets are accelerated by the faster gas molecules due to impact interaction so that in the plane E3 they will have reached almost the same velocity $v_{T3}$ as the gas velocity $v_{G3}$. Due to their high kinetic energy the droplets follow the deflecting section III only to a small extent and describe droplet trajectories (drawn in full lines) which deviate from the gas stream lines (drawn in broken lines in FIG. 2) and guide the droplets to the pressure side D of the profile elements at angles of impact which largely avoid reflection. Thereby a major portion of the droplets including small and floating droplets is eliminated from the gas flow.

Downstream of the plane E4 a diverging flow passage section in the form of a diffusor IV starts, which constitutes a gentle second deflecting section oppositely to the first one. In this way the gas flow exits from the flow passage in the exit plane E5 at only a small angle, i.e., approximately parallel to the inlet flow direction in the plane E1, at the velocity $v_{G5}$ which is lower than the velocity $v_{G4}$ in the narrowest cross-section in the plane E4. Widening of the diffusor IV is obtained by a continuous reduction of the profile element wall thickness and by the gentle second deflecting section. The flare angle β of the diffusor is in the range between 4° and 12°.

The profile elements 1 according to FIG. 2 may be assembled at different inclinations relative to the vertical. An assembly angle $\alpha_g$ is indicated in FIG. 2 as being between about 0° and 120°. In the assembled position "0°" the droplet acceleration section II is horizontal. If a still smaller angle were used, the eliminated liquid could collect in the troughs formed by the pressure sides D and would therefore no longer be able to flow off towards the noses, i.e., in opposition to the approach flow direction.

Figure 3:
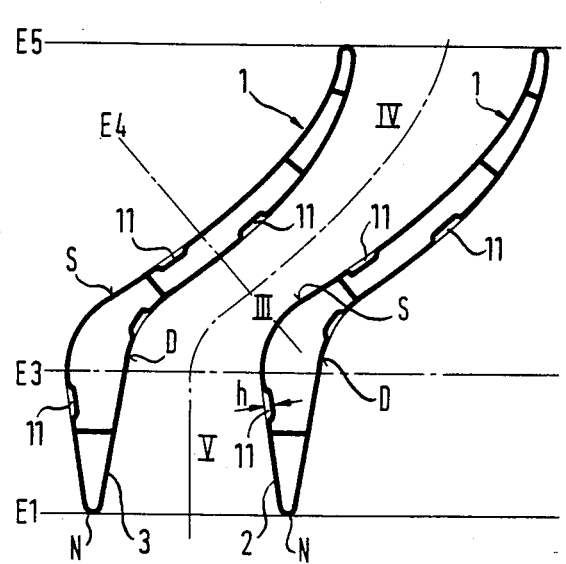
FIG. 3 is a cross-section through a modified profile element in accordance with the invention.

The FIGS. 3 and 4 show a modified embodiment of the profile elements.

The modification resides mainly in that the first restriction I and the droplet acceleration section II are replaced by a joint acceleration section V for gas and droplets. In this acceleration section V the profile element walls form a nozzle section by extending with a conical flare till the plane E3, where the first deflection III starts. As from this point, the configuration of the profile elements or the flow passage, respectively, is identical to that of FIG. 2 and will not be described again. With the profile elements according to FIG. 3 the gas is accelerated more gently in the acceleration section V than in the first restriction I according to FIG. 2. Therefore the gas does not contribute to the droplet acceleration to the same extent as in the droplet acceleration section II of FIG. 2, where the gas is accelerated to a high velocity already at the inlet portion.

The FIGS. 3 and 4 show a supplementary feature, which should suitably also be realized in the profile elements shown in FIG. 2 although not illustrated therein. Accordingly, drain-off passages for the eliminated water comprising primary stem portions 10 and secondary stem portions 11, 12 branching off the former at oppositely directed inclinations are embossed in the profile elements 1. The primary stem portions terminate at the noses N of the profile elements. The width e of the primary and secondary stem portions is between about 4 and 10 mm, and the depth h thereof is between 0.5 and 2 mm. The angle of inclination φ of the secondary stem portions 11, 12 is in the range between about 10° and 30°.

Advantageously, the secondary stem portions 11, 12 are provided on the pressure side D of the profile elements in the eliminating region, i.e., downstream of the plane E3 or the start of the first deflecting portion III, respectively, whereas the first secondary stem portion 11 on the suction side S is advantageously already provided upstream of the first deflecting portion in the region of the acceleration section II or V, so that the few droplets reflected off the pressure side D and reaching this region may be drained off.

Figure 5:
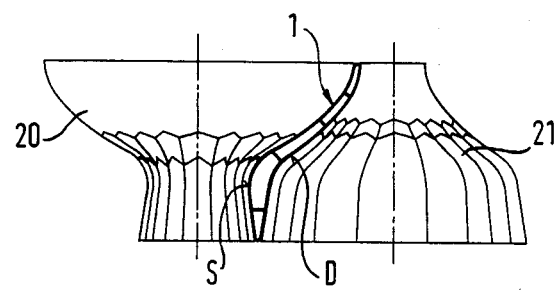
FIG. 5 is a manufacturing phase of the profile element according to FIG. 4.

FIG. 5 illustrates embossing of the drain-off passages 10, 11, 12 into a profile element 1 according to FIG. 2. Preferably, the profile element 1 is passed directly after extrusion between two heated rolls 20, 21 the surfaces of which are embossed with the "negative" pattern of the drain-off passages for the suction side S and the pressure side D, respectively. Thus, the counter-rotating rolls 20, 21 will emboss the suction side S and the pressure side D of the profile element 1 during passage therethrough with the drain-off passages 10, 11, 12 in a single operation.

The embodiment of the profile elements according to FIG. 6 differs from that shown in FIG. 2 as follows:

Starting from an angle γ=0° in the plane E1 till the plane E3 of the deflection, each profile element in the droplet acceleration section II is curved relative to the approach flow direction slightly and such that the first deflection is increased. In the embodiment illustrated, the average angle γ advantageously is c.12°. Depending on the respective requirements, this angle may take a value of up to 30°. The profile element side 3 is curved into the flow passage, while the profile element side 2 is substantially planar. Though the profile elements of the droplet acceleration section II may be inclined at the angle γ also without any curvature, an arrangement with γ=0 in the plane E1 and a subsequent slight curvature is preferred so as to achieve optimum approach flow characteristics.

The droplets, which have been accelerated approximately to the gas flow velocity till the plane E3, are deflected in the first deflecting section III to a lesser extent than the gas flow and strike the eliminating surface A1 at an angle δ. Due to the inclination γ of the droplet acceleration section II said angle δ is larger and thus more favourable than in case of the profile elements shown in FIG. 2, so that a droplet reflection is precluded more efficiently than with the profile elements according to FIG. 2.

Advantageously, the length of the droplet acceleration section II is about 0.5 times to twice the centre distance t of two adjacent profile elements. The deflection of the droplet paths in the acceleration section, which deflection appears but slight, makes it possible to select the angle of inclination ε of the eliminating surface A1 to be comparatively large relative to a plane E4 without too far reducing the angle of impact δ required for efficient mist elimination. A large angle of inclination ε offers advantages, because the flow towards the outlet of the mist eliminator requires only little further deflection and thus contributes to the prevention of pressure losses.

As in the case of the profile elements shown in FIG. 2, a slightly curved diffusor section IV, in which the velocity energy is largely recovered, is provided downstream of the deflecting and eliminating section III. The desired diffusor flare angle β may be adjusted by corresponding dimensioning of enlargements VI at the ends of the profile elements. Boards may be placed across the straight-cut enlargements VI for access to the mist eliminator.

In the mist eliminator shown in FIG. 6, the droplets strike the first eliminating surface A1 under a favourable angle δ and with a flow velocity which is selected such that droplet reflections are largely prevented. This effect is further promoted by the following design features: The radius of curvature $r_{1,1}$ is selected to be comparatively small on the concave profile element side in the first deflecting section III, i.e., smaller than or at most equal to about 0.25 times the centre distance t. The radius of curvature $r_{2,1}$ is selected to be greater than said value so as to minimize the deflection losses of the gas flow and to prevent excessive velocities. The flute on the concave side of the profile, which has a curvature $r_{1,1}$, is drawn in by the magnitude h relative to the droplet acceleration section II in which advantageously h=(0.05 to 0.2)·t. This configuration largely prevents the droplets from striking the eliminating surfaces approximately tangentially, which would promote droplet reflection. At a small centre distance of the profile elements the mean velocity of the gaseous phase in the deflection section III decreases relative to the velocity in the droplet acceleration section II. This tendency decreases with increasing centre distance t and is finally reversed. Thus, it is possible with one and the same profile element to achieve different results in dependency on the centre distance t selected. It is therefore important that the centre distance t should be selected so as to be matched to the respective eliminator objective.

FIGS. 7a and 7b show enlarged fragments of the eliminating surfaces A (e.g. A1 in FIG. 6). The eliminating surfaces A are covered by liquid films formed by the received droplets. These liquid films have a wavy surface structure shown in the drawing. Depending on the location where a droplet T strikes the wave, different effective angles of impact will result which may differ significantly from the angle of impact $\delta$ included with the wall surface itself. This may result in some few reflections of droplets T, as illustrated in FIG. 7a. When a droplet $T_2$ strikes a droplet $T_1$ that has not yet been completely absorbed in the liquid film, a reflection of droplets $T_2$ as shown in FIG. 7b may likewise be expected in a few cases.

The mist eliminator illustrated in FIG. 8 is a two-stage eliminator intended to achieve higher elimination efficiencies. To this end a first deflecting and eliminating section III having a first eliminating surface A1 is succeeded by a second deflecting and eliminating section V having a second eliminating surface A2 which is bent oppositely to the direction of the first deflecting section. The radii of curvature $r_{2,1}$ and $r_{2,2}$ at the second deflecting section have been selected in this case to be the same as the radii of curvature $r_{1,1}$ and $r_{1,2}$ at the first deflecting section, and the same applies to the drawn-in portion h on the concave profile element side of the second deflecting section. In section V those droplets not yet eliminated at the first eliminating surface A1 will be eliminated at the second eliminating surface A2.

Downstream of section V the profile elements may be configured as shown in broken lines, thereby forming diffusor-like flared sections IV having a flare angle $\beta$.

In case of a configuration of the end portions of the profile elements as shown in full lines it is again possible to place boards on the rims of the profiles, whereby access to the mist eliminator is provided.

The embodiment illustrated in FIG. 9 shows a profile element configuration that corresponds basically to that shown in FIG. 8, the difference being that a second droplet acceleration section VI in the form of a constriction is provided downstream of the first deflecting and eliminating section III. Said constriction is obtained by the wall thickness of the profile element increasing in flow passage direction. The constriction then merges into the second deflecting and eliminating section V, the configuration of which corresponds to that of FIG. 8 and is not described again. Another difference resides in that the profile element side 3 remote from the approaching flow is convexly curved, i.e., is curved into the flow passage, whereas the profile element side 2 is substantially planar or somewhat concavely curved, respectively.

In the embodiment shown in FIG. 9 the major portion of the larger droplets is eliminated in the first stage, i.e., at the first eliminating surface A1, while reflected and smaller droplets are eliminated at the surface A2 in the second eliminator stage. The embodiment shown in FIG. 9 offers advantages in respect of discharge. This may be explained by the distribution of the wall shearing strain $\tau_W$. The low wall shearing strains $\tau_W$ on the surface of the profile element opposite to the eliminating surface A1 permit unobstructed discharge of the water eliminated at the second-stage eliminating surface A2 back to zones of lower air velocities. Discharge of water eliminated in the first stage is facilitated in any case, because in this stage only larger droplets are to be collected so that lower air velocities may be used.

Depending on the droplet size distribution and the desired degree of elimination it may also be desirable to use a multi-stage configuration (not shown) as illustrated in FIG. 8 or 9.

FIG. 10 shows an embodiment with a strongly inclined or vertical arrangement of the longitudinal extension of the profiles. This is indicated by the arrow for the acceleration due to gravity g in FIG. 10, which is directed perpendicularly to the plane of projection.

The embodiment shown in FIG. 10 is similar to the profile element configuration of FIG. 2 except for collecting flutes F including lips L whose tips LS are at a distance of $\frac{1}{4}$ to $\frac{2}{3}$ the length $\mathbf{1}_A$ of the eliminating surface A1 from the apex of the first deflecting section on the concave profile element side or the pressure side of the profile elements, respectively. The collecting flutes F also collect reflected droplets. The collecting flutes are disposed in a zone which for cleaning purposes is well accessible from the inlet side by means of a water jet. This is of especial advantage when the mist eliminator is employed in a flue gas cleaning system where the droplets are laden with scale-forming matter.

I claim:

1. A method of eliminating droplets from a gaseous flow that is guided through flow passageways including constrictions and deflecting sections, in which the walls of the flow passageways are oriented so that the eliminated liquid may flow off along said walls towards the inlet portion of the flow passageways under the action of gravity, characterized in that the flow in the flow passageways formed between adjacent profile elements upstream of the first deflecting sections is accelerated so that at the inlet to the deflecting section at least the small droplets achieve a velocity which is equal to or only comparatively slightly less than the velocity of the gaseous flow.

2. A mist eliminator for eliminating droplets from a gaseous flow, in which flow passageways including constrictions and deflecting sections are formed by means of profile elements on the walls of which the droplets are eliminated and which are oriented such that the eliminated liquid may flow along said walls towards the inlet portion of the flow passageways under the action of gravity, characterized in that a droplet acceleration section is provided between adjacent profile elements upstream of a first deflecting section effective to eliminate droplets, said droplet acceleration section being dimensioned so that at least small droplets are accelerated at the inlet to the first deflecting section to a velocity which differs only slightly from the gas flow velocity.

3. A mist eliminator as claimed in claim 2, characterized in that between two adjacent profile elements there is formed a gas acceleration section with rapid reduction of the flow passage cross-section, which is succeeded downstream thereof by the droplet acceleration section having a substantially constant flow cross-section.

4. A mist eliminator as claimed in claim 3, characterized in that the length of the gas acceleration section is approximately 0.2 to 1-times the length of the droplet acceleration section.

5. A mist eliminator as claimed in claim 4, characterized in that each profile element in the region of the droplet acceleration section, starting from a profile nose on the side of the approaching flow, increases to a profile thickness of about 0.2 to 0.6 times the centre distance (t) between two adjacent profile elements, and that the length (b) of the droplet acceleration section is about 0.5 times to twice the centre distance between two adjacent profile elements.

6. A mist eliminator as claimed in claim 5, characterized in that the predetermined maximum profile element thickness is substantially constant throughout the length of the droplet acceleration section.

7. A mist eliminator as claimed in claim 5, characterized in that each droplet acceleration section is inclined relative to the approach flow direction at an angle of not more than 30°, preferably between 5° and 20°, whereby the first deflection is increased.

8. A mist eliminator as claimed in claim 7, characterized in that the radius of curvature on the concave profile element side at the deflecting section is smaller than or equal to about 0.25 times the centre distance between two adjacent profile elements.

9. A mist eliminator as claimed in claim 7, characterized in that the radius of curvature on the convex profile element side at the deflecting section is larger than or equal to about 0.25 times the centre distance between two adjacent profile elements.

10. A mist eliminator as claimed in claim 9, characterized in that the radius of curvature on the concave profile element side at the deflecting section is smaller than or equal to about 0.25 times the centre distance between two adjacent profile elements.

11. A mist eliminator as claimed in claim 3, characterized in that each profile element in the region of the droplet acceleration section, starting from a profile nose on the side of the approaching flow, increases to a profile thickness of about 0.2 to 0.6 times the centre distance between two adjacent profile elements, and that the length of the droplet acceleration section is about 0.5 times to twice the centre distance between two adjacent profile elements.

12. A mist eliminator as claimed in claim 2, characterized in that the cross section of the profile elements is of unsymmetrical configuration.

13. A mist eliminator as claimed in claim 2, characterized in that the thickness of the profile elements towards the exit plane of the flow passageways, starting with the first deflecting section, is reduced to form diffusors having a flare angle of between 4° and 12°.

14. A mist eliminator as claimed in claim 2, characterized in that the profile elements are provided with drain-off flutes for the eliminated liquid, said drain-off flutes terminating towards the inlet plane.

15. A mist eliminator as claimed in claim 2, characterized in that each droplet acceleration section is inclined relative to the approach flow direction at an angle of not more than 30°, and, whereby the first deflection is increased.

16. A mist eliminator as claimed in claim 2, characterized in that one profile element side is convexly curved into the flow and the other profile element side is substantially planar in said droplet acceleration section.

17. A mist eliminator as claimed in claim 15, characterized in that the droplet acceleration section between the inlet, which is oriented in approach flow direction, and the exit at the first deflecting section is slightly curved.

18. A mist eliminator as claimed in claim 15, characterized in that one profile element side is convexly curved into the flow and the other profile element side is substantially planar in said droplet acceleration section.

19. A mist eliminator as claimed in claim 15, characterized in that the eliminating surface behind the first deflecting section is succeeded by a second deflecting section.

20. A mist eliminator as claimed in claim 19, characterized in that the flow passageway in the region behind the first deflecting section includes a constriction to thereby provide a further droplet acceleration section.

21. A mist eliminator as claimed in claim 19, characterized in that a further eliminating surface is located downstream from the second deflecting section.

22. A mist eliminator as claimed in claim 19, characterized in that the flow passageway in the region behind the second deflecting section includes a constriction to thereby provide a further droplet acceleration section.

23. A mist eliminator as claimed in claim 19, characterized in that the exit ends of the profile elements are enlarged.

24. A mist eliminator as claimed in claim 15, characterized in that the angle is between about 5° and about 20°.

25. A mist eliminator as claimed in claim 2, characterized in that the eliminating surface behind the first deflecting section is succeeded by a second deflecting section.

26. A mist eliminator as claimed in claim 25, characterized in that a further eliminating surface is located downstream from the second deflecting section.

27. A mist eliminator as claimed in claim 2, characterized in that the radius of curvature on the concave profile element side at the each deflecting section is smaller than or equal to about 0.25 times the centre distance between two adjacent profile elements.

28. A mist eliminator as claimed in claim 25, characterized in that the flow passageway in the region behind the first deflecting section includes a constriction to thereby provide a further droplet acceleration section.

29. A mist eliminator as claimed in claim 2, characterized in that the exit ends of the profile elements are enlarged.

30. A mist eliminator as claimed in claim 2, characterized in that between two adjacent profile elements there is formed a gas acceleration section with rapid reduction of the flow passage cross-section, which is succeeded downstream thereof by the droplet acceleration section having a substantially progressively decreasing flow cross-section.

31. A mist eliminator as claimed in claim 2, characterized in that the radius of curvature on the convex profile element side at the deflecting section is larger than or equal to about 0.25 times the center distance between two adjacent profile elements.

32. A mist eliminator as claimed in claim 31, characterized in that the radius of curvature on the concave profile element side at the deflecting section is smaller than or equal to about 0.25 times the centre distance between two adjacent profile elements.

33. A mist eliminator for eliminating droplets from a gaseous flow, in which flow passageways including constrictions and deflecting sections are formed by means of profile elements on the walls of which the droplets are eliminated and which are oriented such that the eliminated liquid may flow off along said walls substantially transversely to the main flow direction under the action of gravity, a droplet acceleration section being provided between adjacent profile elements in the region preceding a deflecting section and collecting flutes being formed on an eliminating surface following the deflecting section, characterized in that the maximum thicknesses of each profile element is about 0.2 to about 0.6 times the centre distance between two adjacent profile elements, that the length of the droplet acceleration section is about 0.5 times to about twice the centre distance, and that the collecting flutes are disposed on the eliminating surfaces in such a way that their tips, as viewed in the direction of flow, are spaced from the preceding deflecting section by between about $\frac{1}{4}$ and about $\frac{2}{3}$ the length of the eliminating surface following said deflecting section.

* * * * *